US006731835B2

United States Patent
Liao et al.

(10) Patent No.: US 6,731,835 B2
(45) Date of Patent: May 4, 2004

(54) OPTIC SWITCH

(75) Inventors: Chih-Yuan Liao, Tu-Chen (TW); Kun-Tsan Wu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 129 days.

(21) Appl. No.: 10/033,258

(22) Filed: Dec. 26, 2001

(65) Prior Publication Data

US 2003/0081884 A1 May 1, 2003

(30) Foreign Application Priority Data

Oct. 31, 2001 (TW) ........................... 90218620 U

(51) Int. Cl.$^7$ ................................. G02B 6/26
(52) U.S. Cl. ............................ 385/18; 385/16
(58) Field of Search ........................ 385/16, 18

(56) References Cited

U.S. PATENT DOCUMENTS

| | | | | |
|---|---|---|---|---|
| 4,720,172 A | * | 1/1988 | Baker | 385/16 |
| 5,042,889 A | * | 8/1991 | Benzoni | 385/16 |
| 5,073,040 A | * | 12/1991 | Guinard | 385/26 |
| 6,424,757 B1 | * | 7/2002 | Sparks et al. | 385/18 |
| 6,470,111 B2 | * | 10/2002 | Mortenson et al. | 385/18 |
| 6,526,197 B2 | * | 2/2003 | Zhang | 385/18 |
| D474,157 S | * | 5/2003 | Liao | D13/158 |
| D474,158 S | * | 5/2003 | Liao | D13/158 |
| D474,451 S | * | 5/2003 | Liao | D13/158 |
| 6,563,975 B2 | * | 5/2003 | Towery | 385/18 |
| 2002/0131680 A1 | * | 9/2002 | Wilson et al. | 385/18 |
| 2002/0172454 A1 | * | 11/2002 | Chang | 385/18 |

\* cited by examiner

*Primary Examiner*—Michael P. Stafira
*Assistant Examiner*—Juan D Valentin, II
(74) *Attorney, Agent, or Firm*—Wei Te Chung

(57) ABSTRACT

An optic switch includes a casing to which first and second input devices and first and second output devices are attached. The first input and output devices are aligned with each other and the second input and output devices are aligned with each other. A movable reflection device is movable between a non-engaged position and an engaged position between the input and output devices by a driving device. The movable reflection device has first and second reflective surfaces. A fixed reflection device is fixed inside the casing and has a third reflective surface which is parallel to and opposes the first reflective surface when the movable reflection device is at the engaged position. When the movable reflection device is at the non-engaged position, optic signals from the first and second input devices are allowed to directly pass to the first and second output devices respectively. When the movable reflection device is at the engaged position, the optic signal from the second input device is reflected and redirected by the second reflective surface to the first output device and the optic signal from the first input device is reflected at least three times by the first and third reflective surfaces and redirected to the second output device. Thus a switching operation is realized.

26 Claims, 4 Drawing Sheets

OPTIC SWITCH

BACKGROUND OF THE INVENTION

1. Field of the Invention

The present invention generally relates to an optic switch, and more particular to an optic switch employing multiple reflections of optic signals to realizing switching of optic outputs.

2. The Related Arts

Optic switches are widely used in optic networks. The optic switches are usually classified as mechanical type and non-mechanical type. The mechanical type optic switch realizes switching operation between two or more outputs by moving optic fibers or optic elements with mechanical or electromagnetic means. Since an optic fiber is generally very thin, moving the optic fiber to switch between outputs is risky and may cause undesired loss of optic signals. On the other hand, moving an optic element, rather than a fiber, to perform switching operation is more advantageous. Such a method has only a cost of an insertion loss of less than 2 dB but gains a high isolation, sometimes as high as 45 dB. In addition, it is independent of polarization and wavelength of the incoming optic signals. The commonly used optic elements in such a switching device comprise reflectors, lenses, and prisms but not limited thereto, among which reflectors are the most common optic element that is moved to realize switching operation.

U.S. Pat. No. 5,042,889 teaches an optic switch that realizes switching operation by moving a reflector. FIGS. 1 and 2 of the attached drawings illustrate an operation principle of the optic switch. Two optic inputs 130, 150 and two optic outputs 140, 160 are respectively aligned with each other forming two intersecting optic paths between the input and output 130, 140 and the input and output 150, 160 as shown in FIG. 1. By placing a reflector 170 having opposite reflective surfaces 171, 172 (FIG. 3 of the attached drawings) at the intersection of the optic paths, the input signal from the optic input 130 is reflected and redirected by the reflective surface 171 toward the optic output 160, while the input signals from the optic input 150 is reflected and redirected by the reflective surface 172 toward the optic output 140.

Since theoretically, the intersection of the optic paths is a single point, while the reflector that possesses two opposite reflective surfaces is always of a thickness, no matter how small it may be, between the reflective surfaces. As a consequence, only one of the reflective surfaces can be truly located at the intersection point to reflect and precisely redirect the input signals to the new output, while the other one is not. This is shown in the enlarged view of FIG. 3 wherein the reflective surface 171 is exactly located at the intersection point so that the input signals from the input device 130 can be precisely redirected to the output device 160. However, the reflective surface 172 cannot be exactly located at the intersection point and the input signal from the optic input 150 is redirected to the optic output 140 along an offset and non-aligned path indicated by the dashed line shown in FIG. 3. This causes a large signal loss.

It is desired to have an optic switch for overcoming the above problem.

SUMMARY OF THE INVENTION

Accordingly, an object of the present invention is to provide an optic switch, especially a 2×2 optic switch, that is capable to selectively and precisely redirect input signals from two optic inputs toward two optic outputs to realize optic switching operation without significant signal loss.

Another object of the present invention is to provide a mirror type optic switch comprising an additional reflective surface for precisely redirecting input signals to an optical output by means of multiple reflections.

To achieve the above objects, in accordance with the present invention, an optic switch includes a casing to which first and second input devices and first and second output devices are attached. The first input and output devices are aligned with each other and the second input and output devices are aligned with each other. A movable reflection device is movable between a non-engaged position and an engaged position between the input and output devices by a driving device. The movable reflection device has first and second reflective surfaces. A fixed reflection device is fixed inside the casing and has a third reflective surface which is parallel to and opposes the first reflective surface when the movable reflection device is at the engaged position. When the movable reflection device is at the non-engaged position, optic signals from the first and second input devices are allowed to directly pass to the first and second output devices respectively. When the movable reflection device is at the engaged position, the optic signal from the second input device is reflected and redirected by the second reflective surface to the first output device and the optic signal from the first input device is reflected at least three times by the first and third reflective surfaces and redirected to the second output device. Thus a switching operation is realized.

The instant application is essentially of a detailed embodiment of the copending application titled "OPTICAL SWITCH WITH MOVABLE MIRROR" filed Dec. 24, 2001 with an unknown serial number while having the same applicants and the same assignee as the invention. The basic principle of the instant invention is disclosed in such a copending application and should be referred thereto.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
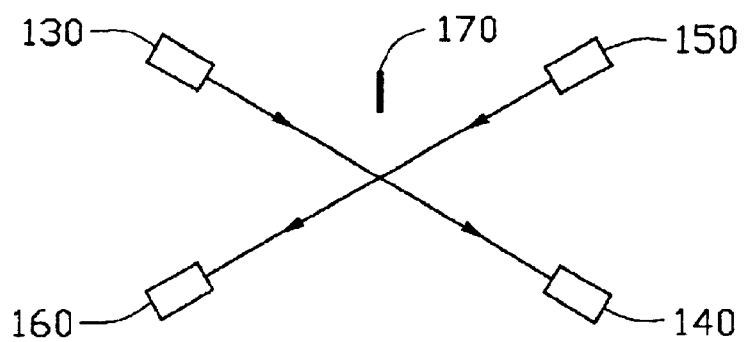
FIG. 1 is a schematic view showing two optic paths in a conventional optic switch before a switching operation is taken.
Figure 2:
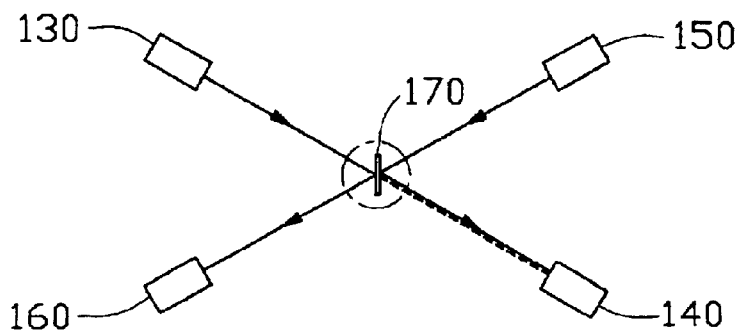
FIG. 2 is a schematic view showing the optic paths of the conventional optic switch after a switching operation is taken.
Figure 3:
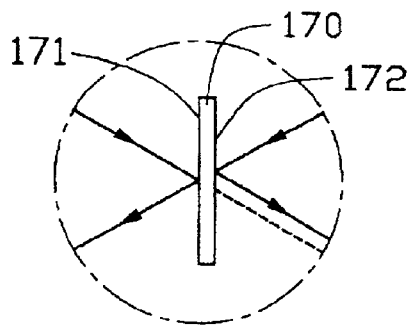
FIG. 3 is an enlarged view of the encircled portion of FIG. 2.
Figure 4:
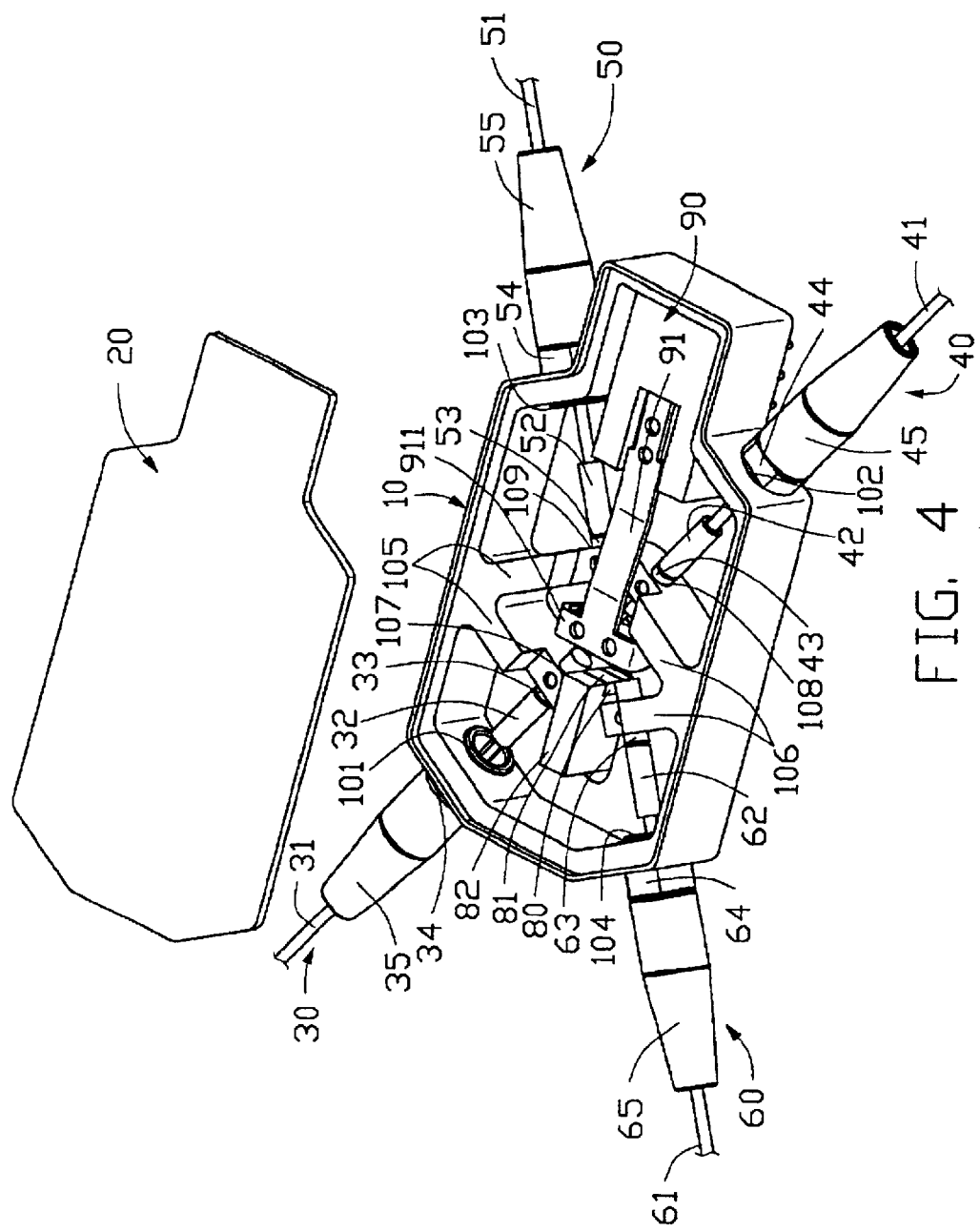
FIG. 4 is an isometric view of an optic switch constructed in accordance with the present invention, with a cover of the optic switch removed to show inside details.
Figure 5:
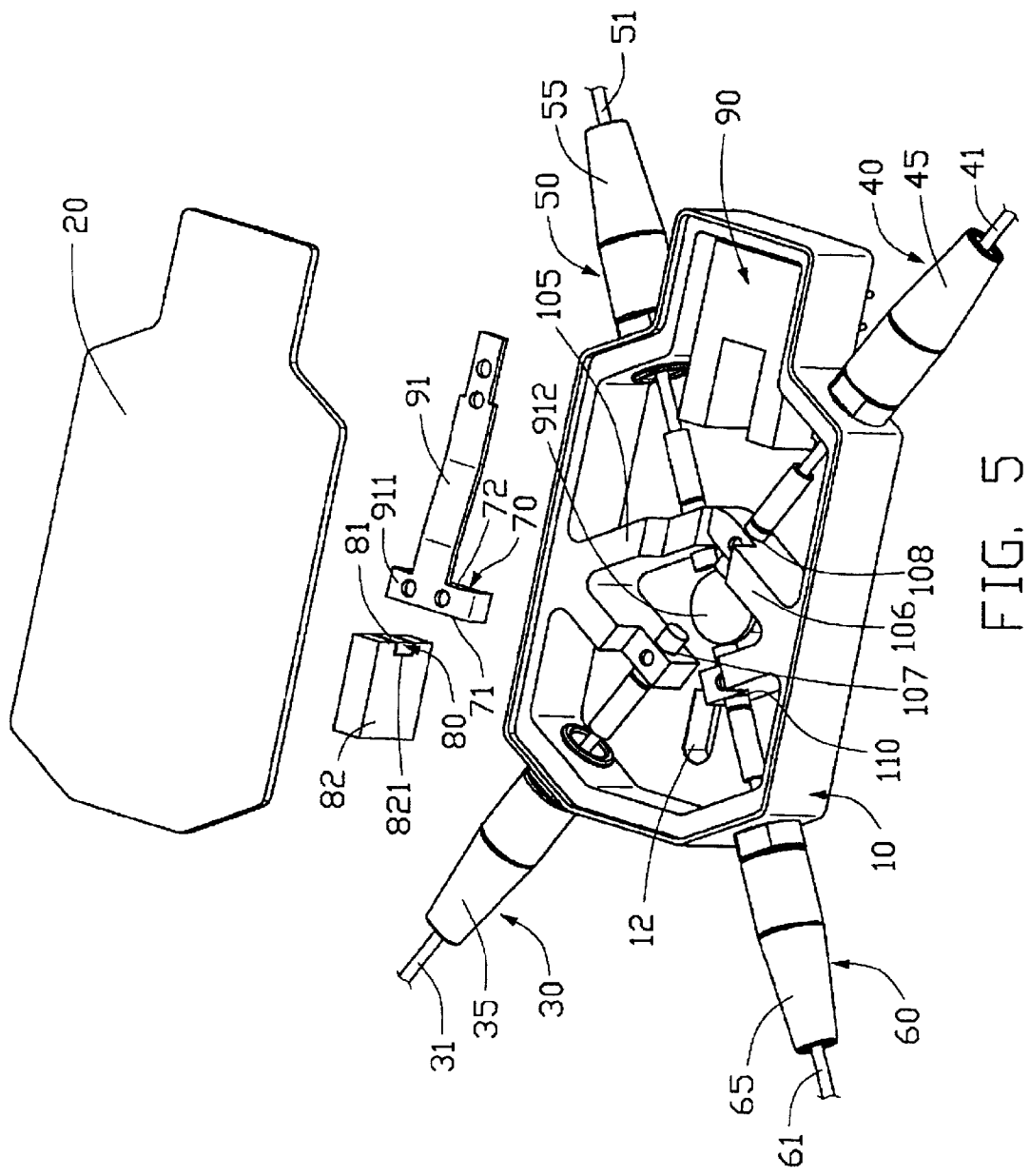
FIG. 5 is an exploded view of the optic switch of the present invention.

With reference to the drawings and in particular to FIGS. 4 and 5, an optic switch constructed in accordance with the present invention comprises a casing 10 and a cover 20 attached to the casing 10 to define a substantially sealed interior space therebetween for accommodating movable and fixed parts of the optic switch. The casing 10 is substantially rectangular and defines first, second, third, fourth holes 101, 102, 103, 104 in four corners thereof whereby the first and second holes 101, 102 are substantially aligned with each other and the third and fourth holes 103, 104 are substantially aligned with each other First and second optic input devices 30, 50 are respectively mounted to the casing 10 through the first and third holes 101, 103 and first and second optic output devices 40, 60 are respectively mounted to the casing 10 through the second and fourth holes 102, 104 whereby the first optic input device 30 is substantially aligned with the first optic output device 40 and the second optic input device 50 is substantially aligned with the second optic output device 60.

Two internal walls 105, 106 are formed inside the casing 10. Each internal wall 105, 106 comprises two branches (not labeled) forming a predetermined included angle therebetween. Bores 107, 108, 109, 110 are respectively defined in the branches of the internal walls 105, 106 whereby the bores 107, 108, 109, 110 are respectively aligned with the holes 101, 102, 103, 104 of the casing 10. The internal walls 105, 106 also serve as structural reinforcement of the casing 10.

Figure 7:
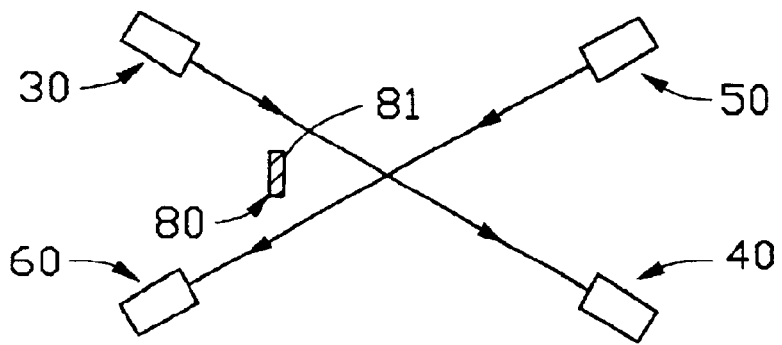
FIG. 7 is similar to FIG. 6, but showing the condition before the switching operation is taken.

Each of the optic input and output devices 30, 40, 50, 60 comprises a fiber 31 (first input fiber), 41 (first output fiber), 51 (second input fiber), 61 (second output fiber) attached to a capillary 32, 42, 52, 62 and a collimating lens 33, 43, 53, 63 attached to an end of the capillary 32, 42, 52, 62. The collimating lenses 33, 43, 53, 63 can be a GRIN lens attached to the capillaries 32, 42, 52, 62 by epoxy based adhesives. The collimating lenses 33, 43, 53, 63 are respectively received and retained in the bores 107, 108, 109, 110 defined in the internal walls 105, 106 with the collimating lenses 33, 53 of the first and second input fibers 31, 41 precisely and respectively aligned with the collimating lenses 43, 63 of the first and second output fibers 41, 61 whereby a first optic path is formed between the first input fiber 31 of the first input device 30 and the first output fiber 41 of the first output device 40. Similarly, a second optic path is formed between the second input fiber 51 of the second input device 50 and the second output fiber 61 of the second output device 60, as shown in FIG. 7. The optic paths intersect.

Each optic input/output device 30, 40, 50, 60 further comprises a securing member 34, 44, 54, 64 respectively attached to the first, second, third, fourth hole 101, 102, 103, 104 defined in the casing 10 to secure the first input fiber 31, the first output fiber 41, the second input fiber 51, the second output fiber 61 to the casing 10. A strain relief 35, 45, 55, 65 is attached to the securing member 34, 44, 54, 64 and encompasses the fiber 31, 41, 51, 61 for protection purposes. Thus, each fiber 31, 41, 51, 61 extends through the strain relief 35, 45, 55, 65 and the hole 101, 102, 103, 104 of the casing 10 with an end thereof attached to the capillary 32, 42, 52, 62.

Figure 6:
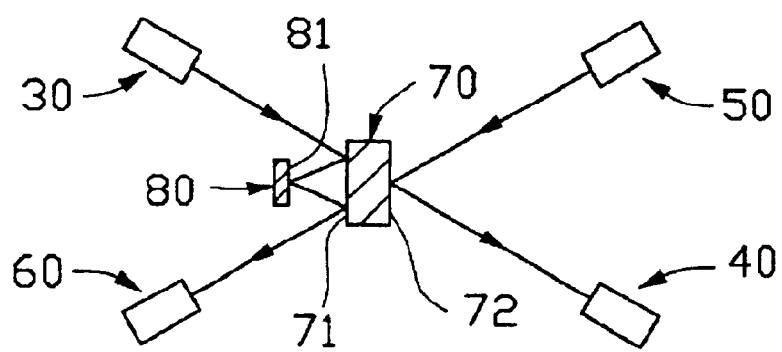
FIG. 6 is a schematic view showing optic paths of the optic switch of the present invention after a switching operation is taken.

A fixed reflection device 80 and a movable reflection device 70 are encased in the casing 10 and are selectively positioned at the intersection between the first and second optic paths between the first pair of input and output devices 30, 40 and between the second pair of input and out devices 50, 60 to switch optic paths between the first and second output devices 40, 60 as shown in FIG. 6.

The movable reflection device 70 comprises reflectors having first and second reflective surfaces 71, 72 and fixed in a retainer 911. Preferably, the first and second reflective surfaces 71, 72 are parallel to each other. An arm 91 extends from the retainer 911 and is coupled to a driving device 90 for moving the movable reflection device 70 into/out of the optic paths between the input devices 30, 50 and the output devices 40, 60. The driving device 90 may be any known means, such as a relay and solenoid. The movable reflection device 70 is, thus, movable between an engaged position (FIG. 6) and a non-engaged position (FIG. 7). A stop 912 is formed inside the casing 10 for stopping the movement of the movable reflection device 70 from the non-engaged position to the engaged position so as to precisely position the movable reflection device 70 in the engaged position.

The fixed reflection device 80 comprises a holder 82 defining a recess 821 for receiving and retaining a reflector that forms a third reflective surface 81. The holder 82 is received and retained in a recess 12 defined in a bottom (not labeled) of the casing 10 whereby the third reflective surface 81 is parallel to and opposing the first reflective surface 71 of the movable reflection device 70. The recess 12 is located to position the fixed reflection device 80 out of the optic paths between the input and output devices 30, 40, 50, 60 whereby no direct interference with the optic paths can be caused.

Preferably, the first, second and third reflective surfaces 71, 72, 81 are made with high reflectivity material, such as zinc sulfide. Preferably, the reflective surfaces 71, 72, 81 are coatings of the high reflectivity material.

Referring to FIG. 7, when the movable reflection device 70 is located at the non-engaged position, optic signals coming from the first and second input devices 30, 50 are not blocked or reflected by any of the reflective surfaces 71, 72, 81 and are thus allowed to pass directly to the corresponding first and second output devices 40, 60.

Referring to FIG. 6, when the movable reflection device 70 is moved to the engaged position, the second reflective surface 72 is exactly located at the intersection of the first and second optic paths thereby precisely reflecting the optic signal coming from the second input device 50 to the first output device 40, while the optic signals coming from the first input device 30 is reflected by the first reflective surface 71 to the third reflective surface 81 of the fixed reflection device 80 and then returned by the third reflective surface 81 to the first reflective surface 71 where the optic signal is reflected again by the first reflective surface 71 to the second output device 60. The optic paths are thus switched.

With the aid of the third reflective surface 81 of the fixed reflection device 80, the first reflective surface 71 does not need to be precisely located at the intersection of the optic paths and neither being necessarily coincident with the second reflective surface 72.

It is apparent to those skilled in the art to attach the third reflective surface 81 to the movable reflection device 70 whereby the third reflective surface 81 moves in unison with the movable reflection device 70 between the engaged position and the non-engaged position. Other modification of the present invention may also be apparent to those skilled in the art, such as changing the shape and size of the reflective surfaces 71, 72, 81 of the fixed and movable reflection devices 70, 80.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An optic switch comprising:
   a casing;
   at least a first and second optic input devices for directing optic signals into the optic switch;
   at least a first and second optic output devices for directing the optic signals out of the optic switch;
   wherein the first optic input device is substantially coaxially aligned with the first optic output device in a first direction, and wherein the second optic input device is substantially coaxially aligned with the second optic output device in a second direction;
   a movable reflection device comprising two movable reflective surfaces and movable between two positions; and
   a fixed reflection device comprising at least one fixed reflective surface;
   wherein when the movable reflection device is at a first position, light from the first optic device directs to the first optic output device, light from the second optic input device directs to the second optic output device, when the moveable reflection device at a second position, light from the first optic input device reflected by a first movable reflective surface and the fixed reflective surface to the second output device, light from the second input device is reflected by a second moveable reflective surface and direct to the first output device.

2. The optic switch as claimed in claim 1, wherein the movable reflective surfaces are parallel to the fixed reflective surface.

3. The optic switch as claimed in claim 2, wherein the second moveable reflective surface is located at a joint point of the first and second directions, the first moveable reflective surface is not located the joint point.

4. The optic switch as claimed in claim 1, wherein the optic input devices and optic output devices are mounted in the casing.

5. The optic switch as claimed in claim 1, further comprising two reinforcing walls formed inside the casing and supporting the optic input devices and optic output devices.

6. The optic switch as claimed in claim 5, wherein each reinforcing wall comprises two branches.

7. The optic switch as claimed in claim 5, wherein each branch of each reinforcing wall defines a bore for receiving and retaining a corresponding one of the optic input and output devices and a collimating device of the one of the optic input and output devices.

8. The optic switch as claimed in claim 1, further comprising a stop for limiting the movement of the movable reflective surfaces.

9. An optic switch comprising:
   a casing;
   a first optic input device attached to the casing;
   a first optic output device attached to the casing and aligning with the first optic input device in a first direction;
   a second optic input device attached to the casing;
   a second output device attached to the casing and aligning with the second optic output device in a second direction;
   a movable reflection device having first and second reflective surfaces and movable between first and second positions, at least a reflective surface located at an intersection of the first and second directions;
   a fixed reflection device comprising at least a reflective surface which is opposite to and parallel to the reflective surface located at the intersection and a predetermined distance is defined therebetween;
   a driving device for driving the movable reflection device between the first and second positions; and
   a cover;
   wherein when the movable reflection device is at the first position, the movable reflection device is located outside a first optic path formed between the first optic input device and the first optic output device and a second optic path formed between the second optic input device and the second optic output device, whereby an optic signal from the first optic input device follows the first optic path toward the first optic output device and an optic signal from the second optic input device follows the second optic path toward the second optic output device; and
   when the movable reflection device is at the second position, the movable reflection device is located on the optic paths, the optic signal from the first optic input device is redirected to the second optic output device and the optic signal from the second optic input device is redirected to the first optic output device.

10. The optic switch as claimed in claim 9, wherein the casing defines four opposite holes in four corners thereof, two reinforcing walls being formed inside the casing, each reinforcing wall having two branches, and a holder for holding the fixed reflection device being formed in the casing.

11. The optic switch as claimed in claim 9, wherein each branch of each reinforcing wall defines a bore.

12. The optic device as claimed in claim 10, wherein the holder defines a recess for receiving and retaining the reflective surface of the fixed reflection device.

13. The optic switch as claimed in claim 9, wherein each of the optic input and output devices comprises a capillary, a securing member and a strain relief.

14. The optic switch as claimed in claim 13, wherein the securing member secures an associated one of the optic input and output devices to the corresponding hole of the casing.

15. The optic switch as claimed in claim 14, wherein the strain relief is attached to the securing member.

16. The optic switch as claimed in claim 13, wherein each of the optic input and output devices comprises a fiber extending through the strain relief and the securing member and having an end attached to the capillary.

17. The optic switch as claimed in claim 9, wherein the optic input devices, the optic output devices, the movable reflection device and the fixed reflection device are received and fixed inside an interior space defined between the casing and the cover.

18. The optic switch as claimed in claim 10, wherein the optic input and output devices are secured to the branches of the reinforcing walls.

19. The optic switch as claimed in claim 9, wherein the driving device comprises an arm connected to the movable reflection device for moving the movable reflection device between the first and second positions.

20. The optic switch as claimed in claim 19, wherein a retainer is attached to the arms of the driving device, the first and second reflective surfaces being retained in the retainer.

21. The optic switch as claimed in claim 9, wherein the driving device comprises a relay or a solenoid.

22. The optic switch as claimed in claim 9, wherein the first and second reflective surfaces of the movable reflection device and the reflective surface of the fixed reflection device are formed by a coating of high reflectivity material.

23. The optic switch as claimed in claim 9, further comprising a stop for limiting the movement of the movable reflection device.

24. An optic switch comprising:

a casing to which a first input device, a first output device, a second input device and a second output device are attached, the first and second input devices being adapted to convey optic signals into the optic switch and the first and second output devices being adapted to convey optic signals out of the optic switch, the first input device aligning with the first output device, the second input device aligning with the second output device;

a movable reflection device arranged in the casing and moveable between a non-engaged position and an engaged position, the movable reflection device having first and second reflective surfaces; and an additional third reflective surface which is parallel to and opposes the first reflective surface when the movable reflection device is at the engaged position;

wherein when the movable reflection device is at the non-engaged position, optic signals conveyed into the optic switch by the first and second input devices are allowed to directly pass to the first and second output devices respectively, while when the movable reflection device is at the engaged position, the optic signal conveyed into the optic switch by the second input device is reflected by the second reflective surface to the first output device and the optic signal conveyed into the optic switch by the first input device is reflected at least three times by both the first reflective surface and the third reflective surface and redirected to the second output device.

25. An optic switch comprising:

an input device and first and second output devices, the input device being adapted to convey an optic signal into the optic switch, the first and second output devices being adapted to selectively convey the optic signal out of the optic switch, the input device and the first output device being aligned with each other;

a primary reflection device having a primary reflective surface movable between a non-engaged position and an engaged position; and a secondary reflection device having a secondary reflective surface which is parallel to and opposes the primary reflective surface when the primary reflection device is at the engaged position;

wherein when the primary reflection device is at the non-engaged position, the optic signal is allowed to directly pass to the first output device and when the primary reflection device is at the engaged position, the optic signal is reflected by the primary and secondary reflective surfaces and redirected to the second output device.

26. An optic device comprising:

first and second optic inputs and first and second optic outputs, the first input and the first output being aligned with each other and forming a first optic path therebetween, the second input and the second output being aligned with each other and forming a second optic path therebetween, the first and second optic paths intersecting at an intersection point, the first and second optic inputs being adapted to respectively convey first and second optic signals to the first and second optic outputs along the first and second optic paths;

a first reflective surface being positionable on the optic paths but not exactly at the intersection point thereof, an auxiliary reflective surface being positioned opposite to the first reflective surface and cooperation with the first reflective surface for reflection and redirection of the first optic signal toward the second output; and a second reflective surface being positionable at the intersection point of the optic paths for reflection and redirection of the second optic signal toward the first optic output.

* * * * *